United States Patent

[11] 3,615,453

| [72] | Inventors | Philip W. Jenkins;<br>Donald W. Heseltine; John D. Mee, all of Rochester, N.Y. |
|---|---|---|
| [21] | Appl. No. | 766,288 |
| [22] | Filed | Oct. 9, 1968 |
| [45] | Patented | Oct. 26, 1971 |
| [73] | Assignee | Eastman Kodak Company<br>Rochester, N.Y. |

[54] CROSSLINKABLE POLYMER COMPOSITIONS
29 Claims, No Drawings

[52] U.S. Cl. .................................................. 96/35.1,
96/115 R, 204/159.14, 204/159.15
[51] Int. Cl. ..................................................... G03c 1/68
[50] Field of Search ................................... 96/115 R,
35.1; 204/159.15, 159.14

[56] References Cited
UNITED STATES PATENTS
2,991,285 7/1961 Feely .......................... 260/827

Primary Examiner—William D. Martin
Assistant Examiner—David Cohen
Attorneys—William H. J. Kline and James R. Frederick ABSTRACT: Polymers having hardenable groups and incorporating an energy-sensitive compound containing a heterocyclic nitrogen atom substituted with an -OR group where R is alkyl, aralkyl or acyl are crosslinked by exposure, including imagewise exposure, to electromagnetic radiation.

CROSSLINKABLE POLYMER COMPOSITIONS

This invention relates to a process for cross-linking polymers, cross-linkable compositions, photographic elements containing cross-linkable compositions and to process for producing images by cross-linking polymers.

Many polymers are cross-linkable. Some cross-link without the addition of an initiator while others require a cross-linking agent. A typical cross-linking agent is formaldehyde. Frequently, cross-linking occurs immediately on the addition of the cross-linking agent. When cross-linking takes place in this manner, the entire polymer is cross-linked i.e., in those areas of the polymer which contain the cross-linking agent. In those cases where cross-linking does not occur merely by adding the cross-linking agent, additional energy such as light or heat is necessary to initiate the reaction. It is this latter system which is most useful in the photographic area. The cross-linked polymer being harder and more insoluble than the un-cross-linked material, generally can be separated from the un-cross-linked material by treating the polymer with a solvent for the uncross-linked polymer. Thus, when a photographic element containing a layer of the cross-linkable polymer having a cross-linking agent uniformly distributed throughout, is subjected to a pattern of activating radiation such as light or heat, the polymer is hardened in the radiation struck areas and an image can be produced merely by washing as explained previously.

It is an object of this invention to provide a novel cross-linkable composition containing a polymer and a novel cross-linking agent.

It is also an object of this invention to provide a novel photographic element containing novel cross-linkable compositions.

It is a further object of this invention to provide a novel process for cross-linking a polymer.

Another object of this invention is to provide a process for forming an image using the novel cross-linkable compositions.

It is also an object of this invention to provide a novel process for direct electron recording.

A further object of this invention is to provide a novel class of dye mordants.

These and other objects are accomplished with cross-linkable compositions comprising a polymer having hardenable groups and a dye cross-linking agent having one of the following structures:

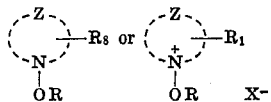

wherein:
A. $R_1$ can be any of the following:
  a. a methine linkage terminated by a heterocyclic nucleus of the type contained in cyanine dyes, e.g., those set forth in Mees and Jones "The Theory of the Photographic Process," MacMillan 3rd ed., pp. 198–232; the methine linkage can be substituted or unsubstituted, e.g., —CH=, —C(CH$_3$)=, —C(C$_6$H$_5$)=, —CH=CH—CH=, etc.,
  b. an alkyl radical preferably containing one to eight carbon atoms including a substituted alkyl radical;
  c. an aryl radical including a substituted aryl radical such as a phenyl radical, a naphthyl radical, a tolyl radical, etc.,
  d. a hydrogen atom;
  e. an acyl radical having the formula wherein R is hydrogen or an alkyl group preferably having one to eight carbon atoms;
  f. an anilinovinyl radical having the formula

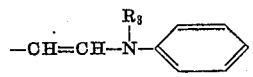

wherein $R_3$ is hydrogen or alkyl; or
  g. a styryl radical including substituted styryl radicals, e.g.

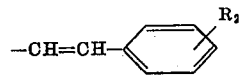

wherein $R_2$ is hydrogen, alkyl, aryl, amino including dialkylamino such as dimethylamino;
B. R can be either
  a. an alkyl radical preferably having one to eight carbon atoms such as methyl, ethyl butyl, etc., including a substituted alkyl radical such as sulfoalkyl, e.g., —CH$_2$SO$_{31}$, an aralkyl, e.g., benzyl or pyridinato-oxyalkyl salt, e.g., —(CH$_2$)$_3$—O—Y wherein Y is a substituted or unsubstituted pyridinium salt; or
  b. an acyl radical e.g.,

wherein $R_6$ is an alkyl radical preferably having one to eight carbon atoms or aryl radical, e.g., methyl, ethyl, propyl, butyl, phenyl, naphthyl, etc., C. Z represents the atoms necessary to complete a five to six membered heterocyclic nucleus including a substituted heterocyclic nucleus which nucleus can contain at least one additional hetero atom such as oxygen, sulfur, selenium or nitrogen, e.g., a pyridine nucleus, an indole nucleus, a quinoline nucleus, etc., D. $R_8$ can be either of the following:
  a. a methine linkage terminated by a heterocyclic nucleus of the type contained in merocyanine dyes, e.g., those set forth in Mees and James (cited above); the methine linkage can be substituted or unsubstituted; or
  b. an allylidene radical including a substituted allylidene radical such as a dicyanoallylidene radical, an alkylcarboxyallylidene radical or an alkylsulfonylallylidene radical; and E. X represents an acid anion, e.g., chloride, bromide, iodide, perchlorate, sulfamate, thiocyanate, p-toluenesulfonate, methyl sulfate, tetrafluoroborate, etc.

When these compounds are exposed to electromagnetic radiation, they are decomposed by a heterolytic cleavage of the nitrogen-oxygen (N–O) bond to produce a RO$^+$ ion, a dye base and an acid anion. The RO$^+$ ion may be decomposed even further producing an aldehyde and H$^+$ ion. The aldehyde is itself a cross-linking agent and causes cross-linking to occur in those areas of polymer with which it is in contact. The particular route of the fragmentation reaction is somewhat dependent upon the structure of the original compound. However, based upon observations, it is believed that the route followed by most of the dyes of this invention (such as the one given below) when exposed to electromagnetic radiation (such as light) is the following:

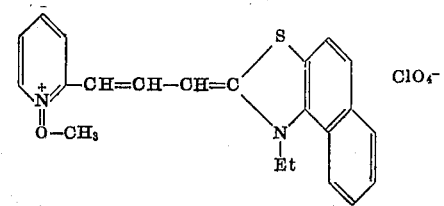

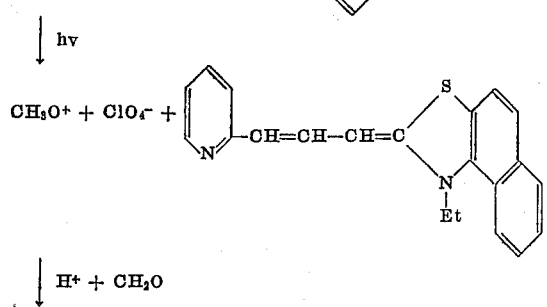

Compounds with an ionic or cationic group attached, when fragmented by energy, produce an aldehyde with a potential mordanting group. These compounds permit the cross-linked polymer to be easily dyed with conventional cationic or anionic dyes, the compounds upon decomposition simultaneously causing cross-linking and the attachment of a mordanting group to the polymer. A typical compound designed to produce an anionic mordant is set forth below together with the fragmentation reaction.

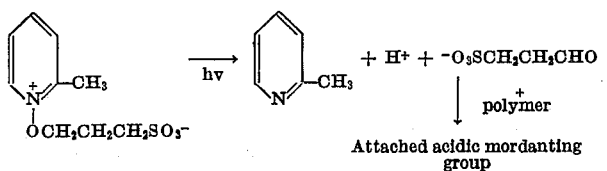

Attached acidic mordanting group

Such a mordant makes the polymer receptive to cationic dyes such as methylene blue. Cationic mordants can also be formed from the novel initiators of this invention. A typical compound and reaction are the following:

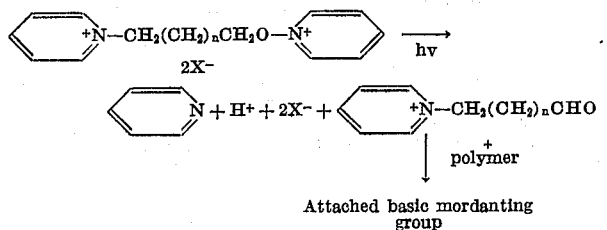

Attached basic mordanting group

Mordants of this type render the polymer receptive to anionic dyes.

The preferred photochemical initiating dyes of this invention have one of the following structures:

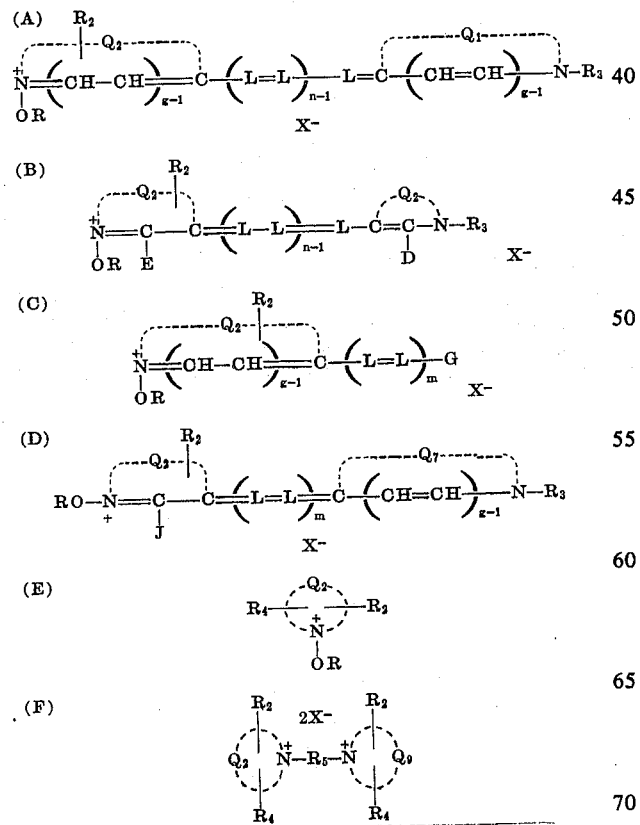

wherein $Q_1$, $Q_2$, $Q_3$, $Q_7$ and $Q_9$ each represent the nonmetallic atoms necessary to complete a sensitizing or desensitizing nucleus containing from five to six atoms in the heterocyclic ring, which nucleus may contain a second heteroatom such as oxygen, sulfur, selenium or nitrogen, i.e., a nucleus of the type used in the production of cyanine dyes, such as the following representative nuclei: a thiazole nucleus, e.g., thiazole, 4-methylthiazole, 3-ethylthiazole, 4-phenylthiazole, 5-methylthiazole, 5-phenylthiazole, 4,5-dimethylthiazole, 4,5-diphenylthiazole, 4-(2-thienyl)thiazole, benzothiazole, 4-chlorobenzothiazole, 4- or 5-nitrobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 6-nitrobenzothiazole, 5-bromobenzothiazole, 6-bromobenzothiazole, 5-chloro-6-nitrobenzothiazole, 4-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, α-naphthothiazole, β-naphthothiazole, β,β-naphthothiazole, 5-methoxy-β,β-naphthothiazole, 5-ethoxy-β-naphthothiazole, 8-methoxy-α-naphthothiazole, 7-methoxy-α-naphthothiazole, 4:-methoxythianaphtheno-7:, 6:, 4, 5-thiazole, nitro group substituted naphthothiazoles, etc., an oxazole nucleus, e.g., 4-methyloxazole, 4-nitrooxazole, 5-methyloxazole, 4-phenyloxazole, 4,5-diphenyloxazole, 4-ethyloxazole, 4,5-dimethoxazole, 5-phenyloxazole, benzoxazole, 5-chlorobenzoxazole, 5-methylbenzoxazole, 5-phenylbenzoxazole, 5- or 6-nitrobenzoxazole, 5-chloro-6-nitrobenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, α-naphthoxazole, β-naphthoxazole, nitro group substituted naphthoxazoles, etc., a selenoazole nucleus, e.g., 4-methyselenazole, 4-nitroselenazole, 4-phenyselenazole, benzoselenazole, 5-chlorobenzoselenazole, 5-methoxybenzoselenozole, 5-hydroxybenzoselenazole, 5- or 6-nitrobenzoselenazole, 5-chloro-6-nitrobenzoselenazole, tetrahydrobenzoselenazole, α-naphthoselenazole, β-naphthoselenazole, nitro group substituted naphthoselenazoles, etc., a thiazoline nucleus, e.g., thiazoline, 4-methylthiazoline, 4-nitrothiazoline, etc.; a pyridine nucleus, e.g., 2-pyridine, 5-methyl-2-pyridine, 4-pyridine, 3-methyl-4-pyridine, nitro group substituted pyridine, etc.; a quinoline nucleus, e.g., 2-quinoline, 3-methyl-2-quinoline, 5-ethyl-2-quinoline, 6-chloro-2-quinoline, 6-nitro-2-quinoline, 8-chloro-2-quinoline, 6-methoxy-2-quinoline, 8-ethoxy-2-quinoline, 8-hydroxy-2-quinoline, 4-quinoline, 6-methoxy-4-quinoline, 6-nitro-4-quinoline, 7-methyl-4-quinoline, 8-chloro-4-quinoline, 1-isoquinoline, 6-nitro-1-isoquinoline, 3,4-dihydro-1-isoquinoline, 3-isoquinoline, etc.; a 3,3-dialkylindolenine nucleus, preferably having a nitro or cyano substituent, e.g., 3,3-dimethyl-5- or 6-nitroindolenine, 3,3-dimethyl-5- or 6-cyanoindolenine, etc.; and, an imidazole nucleus, e.g., imidazole, 1-alkylimidazole, 1-alkyl-4-phenylimidazole, 1-alkyl-4,5-dimethylimidazole, benzimidazole, 1-alkylbenzimidazole, 1-alkyl-5-nitrobenzimidazole, 1-aryl-5,6-dichlorobenzimidazole, 1-alkyl-α-naphthimidazole, 1-aryl-β-naphthimidazole, 1-alkyl-5-methoxy-α-naphthimidazole, or, an imidazo[4,5-b]quinoxaline nucleus, e.g., 1-alkylimidazo[4,5-b]quinoxaline such as 1-ethylimidazo[4,5-b]quinoxaline, 6-chloro-1-ethylimidazo[4,5-b]quinoxaline, etc., 1-alkenylimidazo[4,5-b]quinoxaline such as 1-allylimidazo[4,5-b]quinoxaline, 6-chloro-1-allylimidazo[4,5-b] quinoxaline, etc., 1-arylimidazo[4,5-b]quinoxaline such as 1-phenylimidazo[4,5-b]quinoxaline, 6-chloro-lphenylimidazo[4,5-b]quinoxaline, etc.; a 3,3-dialkyl-3H-pyrrolo[2,3-b]3,3-dimethyl-3H-pyrrolo[2,3-b]
pyridine, 3,3-diethyl-3H-pyrrolo[2,3-b]pyridine, etc.; a thiazolo[4,5chb]quinoline nucleus; an indolyl nucleus including substituted indolyl nuclei such as a 2-phenyl-3-indole, 1-methyl-2-phenyl-3-indole; and the like; $R_3$ represents an alkyl group, including substituted alkyl (preferably a lower alkyl containing from one to four carbon atoms), e.g., methyl, ethyl, propyl, isopropyl, butyl, hexyl, cyclohexyl, decyl, dodecyl, etc., and substituted alkyl groups (preferably a substituted lower alkyl containing from one to four carbon atoms), such as a hydroxyalkyl group, e.g., β-hydroxyethyl, ω-hydroxybutyl, etc., an alkoxyalkyl group, e.g., β-methoxyethyl, ω-butoxybutyl, etc., a carboxyalkyl group, e.g., β-carboxyethyl, ω-carboxybutyl, etc., an alkoxy group, e.g., methoxy, ethoxy, etc., a sulfoalkyl group, e.g., ω-sulfoethyl, ω-sulfobutyl, etc., a sulfatoalkyl group, e.g., β-sulfatoethyl, ω-sulfatobutyl, etc., an acyloxyalkyl group, e.g., β-acetoxyethyl, γ-acetoxypropyl, ω-butyryloxybutyl, etc., an alkoxycarbonylalkyl group, e.g., β-methoxycarbonylethyl, ω-ethoxycarbonylbutyl, etc., or an aralkyl group, e.g., benzyl, phenethyl, etc.; an alkenyl group, e.g., allyl, 1-propenyl, 2-butenyl, etc., or an aryl group, e.g., phenyl, tolyl, naphthyl, methoxyphenyl, chlorophenyl, etc.;

$n$ is a positive integer from one to four;

$m$ is a positive integer from one to three;

$g$ is a positive integer from one to two;

L represents a methine linkage, e.g., —CH=, —C(CH$_3$)=, —C(C$_6$H$_5$)=, etc.;

D, E, J, R$_2$ and R$_4$ each represent a hydrogen atom, an alkyl group (preferably a lower alkyl containing from one to four carbon atoms), e.g., methyl, ethyl, propyl, isopropyl, butyl, decyl, dodecyl, etc., or an aryl group, e.g., phenyl, tolyl, naphthyl, methoxyphenyl, chlorophenyl, nitrophenyl, etc.;

X represents an acid anion, e.g., perchlorate, tetrafluoroborate, chloride, bromide, iodide, perchlorate, tetrafluoroborate, sulfamate, thiocyanate, p-toluenesulfonate, methyl sulfate, etc.;

G represents an anilino radical or an aryl radical, e.g., phenyl, naphthyl, dialkylaminophenyl, tolyl, chlorophenyl, nitrophenyl, etc.;

R$_5$ is an alkyleneoxy radical having one to eight carbon atoms in the alkylene chain including an alkylenedioxy radical and an arylenebisalkoxy radical e.g., ethyleneoxy, trimethyleneoxy, tetramethyleneoxy, propylideneoxy, ethylenedioxy, phenylenebisethoxy, etc.

R represents either (1.) an alkyl radical including a substituted alkyl (preferably a lower alkyl having one to four carbon atoms), e.g., methyl, ethyl, propyl, isopropyl, butyl, hexyl, cyclohexyl, decyl, dodecyl, alkaryl such as benzyl, sulfoalkyl such as β-sulfoethyl, ω-sulfobutyl, ω-sulfopropyl, or (2.) an acyl radical, e.g.,

wherein R is an alkyl including a substituted alkyl or an aryl such as methyl, phenyl, naphthyl, propyl, benzyl, etc.

In the above formulas Q$_2$ preferably completes a pyridine, an indole or a quinoline nucleus. Also, D, E, and J are preferably aryl radicals. Nuclei wherein Q$_1$, Q$_2$, Q$_3$, Q$_7$ and Q$_9$ complete an imidazo[4,5-b]quinoxaline nucleus, or a nitro group substituted thiazole, oxazole, selenazole, thiazoline, pyridine, quinoline, indole, or imidazole nucleus are desensitizing nuclei.

Typical dye crosslinking compounds used in the invention include the following:

1. 3-ethyl-1:-methoxyoxa-2:-pyridocarbocyanine perchlorate
2. 1:-ethoxy-3-ethyloxa-2:-pyridocarbocyanine tetrafluoroborate
3. 3'-ethyl-1-methoxy-2-pyridothiacyanine iodide
4. 1-ethoxy-3-ethyl-2-pyridothiacyanine tetrafluoroborate
5. 1-benzyloxy-3'-ethyl-2-pyridothiacyanine iodide
6. 3'-ethyl-1-methoxy2-pyridothiacarbocyanine iodide
7. 1-ethoxy-3'-ethyl-2-pyridothiacarbocyanine tetrafluoroborate
8. anhydro-3'-ethyl-1-(3-sulfopropoxy)-2-pyridothiacarbocyanine hydroxide
9. 1-benzyloxy-3'-ethyl-2-pyridothiacyanine perchlorate
10. 3'-ethyl-1-methoxy-2-pyridothiadicarbocyanine perchlorate
11. 1'-methoxy-1,3,3-trimethylindo-2'-pyridocarbocyanine picrate
12. 3'-ethyl-1-methoxy-4', 5'-benzo-2-pyridothiacarbocyanine perchlorate
13. 1-ethoxy-3'-ethyl-4', 5'-benzo-2pyridothiacarbocyanine tetrafluoroborate
14. 1'-ethoxy-3-ethyloxa-2'-carbocyanine tetrafluorobrate
15. 1'-ethoxy-3-ethylthis-2'-cyanine tetrafluoroborate
16. 1'-ethoxy-3-ethylthia-2'carbocyanine tetrafluoroborate
17. 1'-ethoxy-3-ethylthia-2'-dicarbocyanine tetrafluoroborate
18. 1-methoxy-3'-methyl-2-pyridothiazolinocarbocyanine perchlorate
19. 3'-ethyl-1-methoxy-4-pyridothiacyanine perchlorate
20. 3'-ethyl-1-methoxy-4-pyridothiacarbocyanine perchlorate
21. 1,1'-dimethoxy-2,2'-diphenyl-3,3'-indolocarbocyanine perchlorate
22. 1-methoxy-1'-methyl-2,2', 10-triphenyl-3,3'-indolocarbocyanine perchlorate
23. 1,1'-diethoxy-2,2'-diphenyl-3,3'-indolocarbocyanine perchlorate
24. 1-ethoxy-1'-methyl-2,2', 10-triphenyl-3,3'-indolocarbocyanine perchlorate
25. 1'-ethoxy-3-ethyl-4,5-benzothia-2'-carbocyanine tetrafluoroborate
26. 2-β-anilinovinyl-1-methoxypyridinium p-toluenesulfonate
27. 1-ethyl-1'-methoxy-4,5-benzothia-4'-carbocyanine perchlorate
28. 3'-ethyl-1-methoxy-6'-nitro-2phenyl-3indolothiacarbocyanine p-toluenesulfonate
29. 1-ethoxy-3'-ethyl-6'-nitro-2-phenyl-3-indolothiacarbocyanine p-toluenesulfonate
30. 1,3-diallyl-1'-methoxy-2'-phenylimidazo[4,5-b]quinoxalino-3'-indolocarbocyanine perchlorate
31. 1,3-diallyl-1'-ethoxy-2'-phenylimidazo[4,5-quinoxalino-3'-indolocarbocyanine perchlorate
32. 1-methoxy-2-methylpyridinium p-toluenesulfonate
33. 1-methoxy-4-methylpyridinium p-toluenesulfonate
34. anhydro-2-methyl-1-(3-sulfopropoxy)pyridinium hydroxide
35. 1-ethoxy-2-methylpyridinium tetrafluoroborate
36. 1-benzyloxy-2-methylpyridinium bromide
37. 1-ethoxy-2-methylquinolinium tetrafluoroborate
38. 1-methoxy-2-phenylindole
39. 1-ethoxy-2-phenylindole
40. 1'-methoxy-1,3,3-trimethyl-5-nitro-2'-phenylindo-3'-indolocarbocyanine perchlorate
41. 1-methoxy-1', 3', 3'-trimethyl-2phenyl-3-indolo-2'-pyrrolo[2,3-b]pyridocarbocyanine perchlorate
42. 1'-ethoxy-1,3,3-trimethyl-5-nitro-2'-phenylindo-3'-indolocarbocyanine p-toluenesulfonate
43. 1-ethoxy-1', 3', 3'-trimethyl-2-phenyl-3-indolopyrrolo-[2,3-b]pyridocarbocyanine perchlorate
44. 1,1'-ethylenedioxybispyridinium dibromide
45. 1,1'-trimethylenedioxybispyridinium dibromide
46. 1,1'-tetramethylenedioxybis(2-methylpyridinium)dibromide
47. 1,1'-tetramethylenedioxybis(4-methylpyridinium)dibromide
48. 1,1'-tetramethylenedioxybispyridinium dibromide
49. 1,1'-pentamethylenedioxybispyridinium dibromide
50. 1-methoxy-2-phenylindole-3-carboxaldehyde
51. 1-ethoxy-2-phenylindole-3-carboxaldehyde
52. 1-acetoxy-2-(4-dimethylaminostyryl)pyridinium perchlorate
53. 1-benzoyloxy-2-(4-dimethylaminostyryl)pyridinium perchlorate
54. 1,3-diethyl-5-[(1-methoxy-2(1H)-phridylidene)ethylidene]-2-thiobarbituric acid 55. 3-ethyl-5-[(1-methoxy-2(1H)-pyridylidene)ethylidene]rhodanine
56. 1,3-diethyl-5-[(1-methoxy-2(1H)-pyridylidene)ethylidene]barbituric acid
57. 2-(3,3-dicyanoallylidene)-1-methoxy-1,2-dihydropyridine
58. 2-[(1-methoxy-2(1H)-pyridylidene)ethylidene benzo[b]thiophen-3(2H)-one-1,1-dioxide
59. 3-cyano-5-[(1-methoxy-2(1H)-pyridylidene)ethylidene]-4-phenyl-2(5H)-furanone The cross-linking agents of this invention can be prepared according to an application filed concurrently herewith by Jenkins, Heseltine and Mee titled "Energy-Sensitive Systems."

The dye cross-linking agents described herein are capable of cross-linking any polymer containing hardenable groups. These groups can be side groups pendant from the backbone of the polymer chain or can be in the backbone itself. Also, they can be on the ends of the chain. Polymers having hardenable groups include any polymer which has groups which are capable of being cross-linked when treated with an aldehyde. Such groups include:

a. a primary amine radical such as $-NH_2$ including amides such as

and

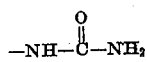

b. secondary amine radicals such as $-NHR$;
c. hydroxyl radicals under acidic conditions, e.g., pH under about 2;
d. any group containing an active methylene group such as (1.) a $\beta$-keto ester, e.g., acetoacetate group or (2.) an $\alpha$-cyano ester, e.g., cyanoacetoxy group or (3.) a group containing an $\alpha$-diketone moiety such as an acetoacetyl or benzoylacetyl group. Illustrative polymers include the following:

1. poly(vinyl alcohol-co-vinyl anthranilate-co-vinyl succinate)
2. poly(ethylacrylate-co-acrylic acid-co-2-acetoacetoxyethyl methacrylate)
3. poly(methylacrylate-co-sodium-3-acryloyloxy-1-methylpropane-1-sulfonate-co-2-acetoacetoxyethyl acrylate)
4. poly(methylacrylate-co-acrylic acid-co-2-methacryloyloxyethyl cyanoacetate)
5. poly(1,2-dimethyl-5-vinylpyridinium methosulfate-co-m-methacryloyl-N'-cyanoacetylhydrazine)
6. poly(3-acryloyloxypropane-1-sulfonic acid, sodium salt-co-N-methacryloyl-N'-glycylhydrazine)
7. poly(1,2-dimethyl-5-vinylpyridinium methosulfate-co-2-aminoethyl methacrylate)
8. poly(acrylamide-co-N-cyanoacetyl-N'-methacryloyl hydrazine)
9. gelatin
10. poly(vinylacetoacetate)

The cross-linking agents used in the invention can be activated (decomposed) by various forms of energy such as (1.) electromagnetic radiation including ultraviolet, visible and infrared light, x-rays, electron beams, laser beams, (2.) heat, (3.) pressure, etc. When a mixture of polymer having hardenable groups and cross-linking agent is exposed to one of these forms of energy, the initiator decomposes producing an aldehyde and a dye base. The aldehyde reacts with the hardenable groups to join two different polymer chains together by cross-links forming a composition having increased viscosity. Of course, the initiator used desirably has maximum absorption in the same regions as the activating radiation. The relative proportions of the polymeric material and the cross-linking agent can be varied as desired or as conditions may require, but ordinarily the proportions thereof in the mixture will be at least about 0.1 percent and generally within a range such that 0.1 to 10 percent by weight of the aldehyde produced on fragmenting the original compound will be present after its decomposition, and preferably 1.0 to 7.0 percent by weight of such aldehyde in the total composition (including polymer and original compound).

The preferred sources of energy include visible light and electron beams. Strong light is not necessary, a 150 watt Xenon arc lamp at a distance of less than a foot being very suitable since at relatively low intensities the photochemical cross-linking influence of the initiators of this invention is sufficiently strong. When electron beams are used, the intensity of the beams can range from 1 kv. to 100 kv. with 15 kv. generally being sufficient.

The time of exposure is not critical but is somewhat dependent upon the amount of cross-linking agent present and the intensity of the light source. Relatively large amounts of cross-linking agent and strong light sources require shorter times of exposure. Periods for exposure can range from a fraction of a second to several hours. However, for most applications 1 second to 1 hour is sufficient.

The crosslinkable compositions of this invention are useful in the reproduction of images in that their exposure to light or other forms of energy can cause insolubilization of the cross-linking composition. Thus, when a layer of one of these compositions, initially soluble, is applied to a support and exposed photographically, the exposed areas become insoluble.

The invention is useful for the formation of elements wholly made from these compositions. The present invention also makes possible the formation of coated printing films on any base by the deposition or coating by conventional means of films or coatings of the subject novel cross-linkable compositions. Typical bases or supports are metal sheets (e.g., copper, aluminum, zinc and magnesium), paper, glass, cellulose acetate butyrate film, cellulose acetate film, poly(vinyl acetal) film, polystyrene film, polycarbonate film, poly(ethylene terephthalate) film, polyethylene-coated paper, nylon and metal screens.

The base or support is typically coated with a solution of the polymeric material in a suitable solvent, this solution containing dissolved or homogeneously dispersed therein, an energy-sensitive cross-linking initiator as described hereinabove whereupon the solvent or solvent mixture is eliminated by known means such as evaporation, leaving a coating of the photosensitive mixture upon the base or support. Thereafter, the dried photosensitive coating can be imagewise exposed to actinic light rays or other suitable energy source.

When the support material carrying the photosensitive composition is light-reflecting, there can be present, e.g., superimposed on said support and adherent thereto or in the surface thereof, a layer or stratum absorptive of actinic light in order to minimize reflectance from the combined support of incident actinic light.

If the cross-linkable composition is water-soluble, water can be used as the solvent in coating the support. If water-insoluble compositions are used, organic solvents, mixtures of organic solvents or mixtures of organic solvents and water can be used. Suitable solvents can be readily ascertained by one skilled in the art.

The elements formed wholly of or coated with the photosensitive composition are useful in photography, photomechanical reproduction processes, lithography and intaglio printing. More specific examples of such uses are offset printing, silk screen printing, duplicating pads, manifold stencil sheeting coatings, lithographic plates, relief plates, and gravure plates. The term "printing plates" as used herein is inclusive of all of these.

A specific application of the invention is illustrated by a typical preparation of a printing plate. In this application a plate, usually of metal, is coated with a film of the cross-linkable composition. Alternatively, any suitable support can be coated with a film of the composition. The surface of the plate is then exposed to visible light through a transparency, e.g., a positive or negative (consisting of opaque and transparent areas). The light induces the decomposition of the cross-linking agent to a dye base and an aldehyde, and the aldehyde in turn cross-links the polymer in the areas of the surface beneath the transparent portions of the image causing these portions to become insoluble, whereas the areas beneath the opaque portions of the image retain their pre-exposure solubility. The soluble areas of the surface are then removed by a solvent, and the insoluble, raised portions of the film which remain serve as a resist image, wherein a relief plate is formed by etching the exposed base material. The plate carrying the insolubilized raised portion, i.e., the relief image, can also be inked and used as a relief printing plate directly in the customary manner.

The thickness of the photosensitive layer is a direct function of the thickness desired in the relief image and this will depend on the subject being reproduced and particularly on the extent of the nonprinting areas. In the case of halftones the screen used is also a factor. In general, the thickness of the photosensitive layer may vary from 0.001 mm. to 7 mm. Layers ranging from 0.001 to 0.70 mm. in thickness may be used for halftone plates. Layers ranging from about 0.05 to about 1.50 mm. in thickness will be used for the majority of letterpress printing plates, including those wherein halftone and line images are to be combined.

The solvent liquid used for washing or "developing" the printing plates made from the photosensitive composition should have good solvent action on the unexposed areas, yet have little action on the hardened image or upon the base material, the antihalation layer, or the subbing layer with which the photosensitive composition may be anchored to the support.

The cross-linkable compositions of the invention show many advantages over the known photosensitive compositions. These compositions can be cross-linked by exposure to any form of light or other energy source simply by selecting a cross-linking agent which is sensitive to the particular form of energy employed. For example, the dye cross-linking agents can be made to have maximum light absorption over wide portions of the visible spectrum facilitating several types of exposing means. Mixtures of such dyes can also be used to facilitate imagewise exposing.

The photosensitive cross-linking compositions are suitable for other purposes in addition to the printing uses described above, e.g., as ornamental plaques or for producing ornamental effects; as patterns for automatic engraving machines, foundry molds, cutting and stamping dies, name stamps, relief maps for braille, as rapid cure coatings, e.g., on film base; for the production of sound tracks on film; for embossing plates, paper, etc.; and in the preparation of printed circuits.

The following examples are included for a further understanding of the invention.

EXAMPLE 1

A composition containing gelatin and compound 32 in an amount sufficient to produce 3.0 percent aldehyde by weight of the total composition is coated on a poly(ethylene terephthalate) film support at a thickness of 6μ. The element is exposed to a transparency having opaque and transparent areas with a 140 watt ultraviolet lamp placed 3 inches away from the surface of element causing cross-linking to occur in the exposed areas. After exposure, the element is washed with water. The unexposed areas wash off leaving only an image formed by the exposed hardened areas. This procedure is repeated for compounds 26, 33, 34, 35, 37, 46 and 47 and similar results are obtained.

EXAMPLE 2

Example 1 is repeated except varying amounts of compound 32 are employed to show the effect on cross-linking for different concentrations of cross-linking agent. The elements are swollen by immersing them in water for 3 minutes. The extent of swelling or percent swell is an indication of the amount of cross-linking which has occurred, smaller amounts of swelling being indicative of greater amounts of cross-linking. The results are set forth in table I below.

TABLE I

| Compound No. | % Aldehyde Relative to Dry Vehicle | % Swell |
| --- | --- | --- |
| Blank | 0 | 580 |
| 32 | 1 | 302 |
| 32 | 2 | 265 |
| 32 | 6 | 85 |

EXAMPLE 3

Example 1 is repeated except compound 46 is used in place of 32 and poly(vinylacetoacetate) is used as the vehicle in place of gelatin. After washing with water, a good relief image is obtained.

EXAMPLE 4

This example illustrates the preparation of a lithographic plate. Compound 32 is mixed with gelatin at a level calculated to produce theoretically 6 percent of formaldehyde with respect to dry weight of gelatin. The composition is coated on an anodized aluminum sheet at a thickness of 0.002 in. The dried coating is exposed for 15 minutes to the light from a 140 watt Hanovia ultraviolet lamp through a definition chart. The exposed plate is washed with 85° F. water for 10 minutes and dried. The sheet is placed on a lithographic printing press and a good press copy is obtained.

EXAMPLE 5

The cross-linkable compositions of this invention are also useful in simple transfer processes. A coating of compound 32 (calculated to produce 6 percent formaldehyde) in gelatin is coated on a fluorinated hydrocarbon resin film ("Teflon") support at a thickness of 0.004 in. The dried material is exposed, as above, through an appropriate negative. The exposed sample is dipped in a warm, silver nitrate-urea solution. The sample is removed from the solution and placed in contact with a Verifax receiving sheet, separated, and the transferred image is developed in Kodak D72 Developer. A good reproduction of the original is obtained.

EXAMPLE 6

Production of Dye Mordants with Simultaneous Hardening

Compounds with ionic or cationic groups attached, when fragmented by energy, produce an aldehyde with a potential mordanting group. A gelatin silver halide emulsion coating containing compound 34 is prepared so that 3 percent of the propionaldehyde-3-sulfonic acid would be expected if 100 percent reaction occurred. The coating is exposed through a mask with the emulsion side toward a 150 watt Xenon arc lamp placed within 1 inch of the opening in the lamp housing. The test pattern is cooled with a stream of nitrogen during a 95 min. exposure. The 1¾ inch square test strip is hardened in a 2 percent succinaldehyde prehardening bath for 1 min. and rinsed under a flow of distilled water at 26° C. for 15 min. The test square is then dyed with a solution of methylene blue prepared by placing 0.1 g. of methylene blue in 10 ml. of water, slurrying for 10 min. and filtering. A definite mordanting is noted in the exposed areas. The strip upon standing in distilled water overnight at room temperature, retains the dyeing of the exposed area.

EXAMPLE 7

A 4½ by 6½ in. coating of poly(vinylacetoacetate) on Estar is prepared containing an amount of compound 47, such that if complete reaction occurred, 6 percent succinaldehyde, with respect to dry polymer, would be expected. This coating is exposed through the Estar base using a combined definition chart, resolution chart, and step wedge coating on glass for 5 hr. and 5 min. (The reason for this long exposure time is that the glass and film base combined present an optical density at 2,500–2,700A in excess of 8.0). The coating is then dyed for 10–15 sec. in a 10 percent solution of 1,8-dihydroxy-2-(6,8-disulfonaphthyl-2-azo)-3,6-disulfonaphthalene, tetrasodium salt, washed with running water, first at 85° F., and then at 91° F. for a total of 20 min. Dyeing occurs preferentially in the exposed areas substantiating a mordanting effect.

EXAMPLE 8

Example 7 is repeated except the cross-linking agent employed is compound 46 and the dye used is 1,5-disulfomethylamino-3,7-disulfo-4,8-dihydroxyanthraquinone tetrasodium salt. Similar results are obtained.

EXAMPLE 9

Direct Electron Recording

Energy other than light can be used to produce fragmentation of the novel cross-linking agents of this invention. A set of strips is coated with a composition containing gelatin and sufficient amounts of cross-linking agent to produce 6 percent aldehyde relative to the dry vehicle. The cross-linking agents employed are compounds 32, 46 and 47. The strips are then subjected to a graded series of exposures to 15 kilovolt electrons. The strips are then washed with water and inspected for differential hardening. Each of the strips contained hardened areas.

EXAMPLE 10

In order to determine the mordanting effect, each of the exposed strips are bathed in the dye solution used in example 7. Dyeing occurs preferentially in the exposed areas. When the dye strips are placed in distilled water overnight, the dye is not removed.

The invention has been described in detail with particular reference to certain preferred embodiments thereof, but it will be understood that variations and modifications can be effected within the spirit and scope of the invention as described hereinabove and as defined in the appended claims.

We claim:

1. An image-forming element comprising a support and at least one layer of a cross-linkable composition comprising a polymer having hardenable groups and a cross-linking agent having a formula selected from the group consisting of:

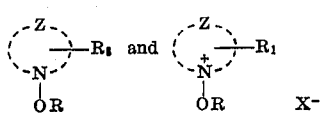

wherein:

1 $R_a$ is selected from the group consisting of:
  a. a methine linkage terminated by a heterocyclic nucleus of the type contained in cyanine dyes,
  b. an alkyl radical,
  c. an anilinovinyl radical,
  d. a hydrogen atom,
  e. an aryl radical,
  f. an aldehyde group, and
  g. a styryl radical;
B. R is selected from the group consisting of:
  a. an alkyl radical and
  b. an acyl radical;

C. $R_8$ is selected from the group consisting of:
  a. a methine linkage terminated by a heterocyclic nucleus of the type contained in merocyanine dyes and
  b. an allylidene radical;
D. X is an acid anion; and
E. Z represents the atoms necessary to complete a five to six membered heterocyclic nucleus.

2. The image-forming element as defined in claim 1 wherein Z represents the atoms necessary to complete a member selected from the group consisting of a pyridine nucleus, a quinoline nucleus and an indole nucleus.

3. The image-forming element as defined in claim 1 wherein $R_1$ is a methine linkage terminated by a five to six membered heterocyclic nucleus having at least one heteronitrogen atom.

4. An image-forming element comprising a support and at least one layer of a cross-linkable composition comprising a polymer having hardenable groups and a cross-linking agent having a formula selected from the group consisting of:

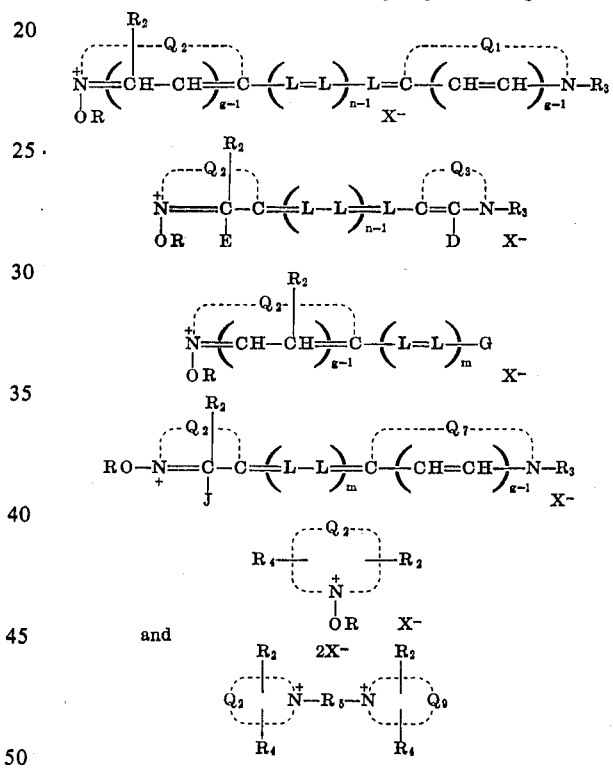

wherein:
A. $Q_1$, $Q_2$, $Q_3$, $Q_7$ and $Q_9$ each represent the nonmetallic atoms necessary to complete a five to six membered heterocyclic nucleus;
B. $n$ is a positive integer from one to four;
C. $m$ is a positive integer from one to three;
D. $R_5$ is an alkyleneoxy radical having one to eight carbon atoms in the alkylene chain;
E. $g$ is a positive integer from one to two;
F. X is an acid anion;
G. L is a methine linkage;
H. R is selected from the group consisting of an alkyl radical and an acyl radical;
I. D, E, J, $R_2$ and $R_4$ are each selected from the group consisting of an aryl radical, a hydrogen atom and an alkyl radical;
J. $R_3$ is selected from the group consisting of an alkyl radical, an alkenyl radical, an aryl radical and an alkoxy radical; and
K. G is selected from the group consisting of an anilinovinyl radical and an aryl radical.

5. The image-forming element as defined in claim 4 wherein said polymer having hardenable groups is gelatin.

6. The image-forming element as defined in claim 4 wherein said polymer having hardenable groups is poly(vinylacetoacetate).

7. The image-forming element as defined in claim 4 wherein said cross-linkable composition comprises a polymer selected from the group consisting of gelatin and poly(vinylacetoacetate) and a cross-linking agent having the formula:

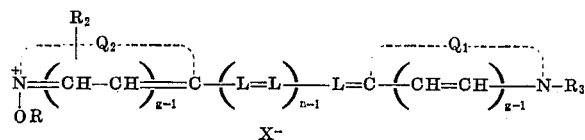

wherein R, $R_2$, $R_3$, $Q_1$, $Q_2$, L, X, g and n are as previously defined.

8. The image-forming element as defined in claim 4 wherein said cross-linkable composition comprises a polymer selected from the group consisting of gelatin and poly(vinylacetoacetate) and a cross-linking agent having the formula:

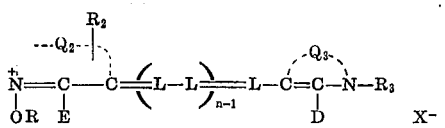

wherein R, $R_2$, $R_3$, $Q_2$, $Q_3$, L, D, E, X and n are as previously defined.

9. The image-forming element as defined in claim 4 wherein said cross-linkable composition comprises a polymer selected from the group consisting of gelatin and poly(vinylacetoacetate) and a cross-linking agent having the formula:

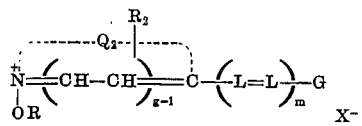

wherein R, $R_2$, $Q_2$, L, G, X, m and g are as previously defined.

10. The image-forming element as defined in claim 4 wherein said cross-linkable composition comprises a polymer selected from the group consisting of gelatin and poly(vinylacetoacetate) and a cross-linking agent having the formula:

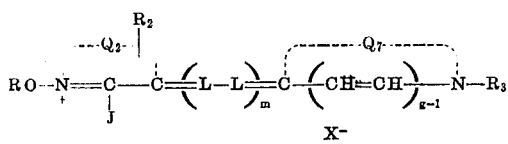

wherein R, $R_2$, $R_3$, J, $Q_2$, $Q_7$, L, X, m and g are as previously defined.

11. The image-forming element as defined in claim 4 wherein said cross-linkable composition comprises a polymer selected from the group consisting of gelatin and poly(vinylacetoacetate) and a cross-linking agent having the formula:

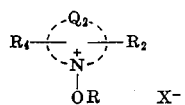

wherein R, $R_2$, $R_4$, $Q_2$ and X are as previously defined.

12. The image-forming element as defined in claim 4 wherein said cross-linkable composition comprises a polymer selected from the group consisting of gelatin and poly(vinylacetoacetate) and a cross-linking agent having the formula:

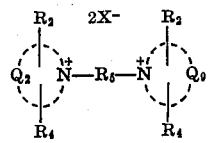

wherein $R_2$, $R_4$, $Q_2$, $Q_9$, X and $R_5$ are as previously defined.

13. A process for forming an image which comprises exposing an image-forming element in an imagewise manner to a form of electromagnetic energy, said element comprising a support having coated thereon a layer of a composition comprising a polymer having hardenable groups and a cross-linking agent having a formula selected from the group consisting of:

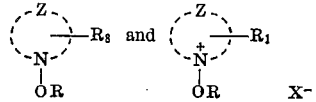

wherein:

A. $R_1$ is selected from the group consisting of a methine linkage terminated by a heterocyclic nucleus of the type contained in cyanine dyes, an alkyl radical, an anilinovinyl radical, a hydrogen atom, an aryl radical, an aldehyde group and a styryl radical;

B. R is selected from the group consisting of an alkyl radical and an acyl radical;

C. $R_8$ is selected from the group consisting of:
  a. a methine linkage terminated by a heterocyclic nucleus of the type contained in merocyanine dyes and
  b. an allylidene radical;

D. X is an acid anion; and

E. Z represents the atoms necessary to complete a five to six membered heterocyclic nucleus.

14. The process of claim 13 wherein Z represents the atoms necessary to complete a member selected from the group consisting of a pyridine nucleus, a quinoline nucleus and an indole nucleus.

15. The process of claim 13 wherein $R_1$ is a methine linkage terminated by a five to six membered heterocyclic nucleus having at least on heteronitrogen atom.

16. The process of claim 13 wherein the form of electromagnetic energy is selected from the group consisting of infrared, visible, ultraviolet and electron radiation.

17. The process of claim 13 including the steps of washing away the unexposed areas with a solvent and dyeing the remaining hardened areas.

18. A process for forming an image which comprises exposing a photographic element in an imagewise manner to a form of electromagnetic energy, said element comprising a support having coated thereon a layer of a composition comprising a polymer selected from the group consisting of gelatin and poly(vinylacetoacetate) and a cross-linking agent having a formula selected from the group consisting of:

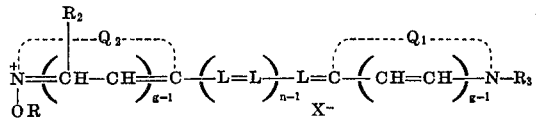

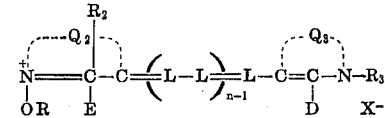

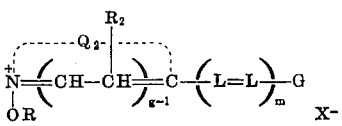

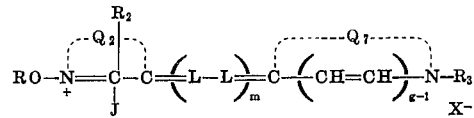

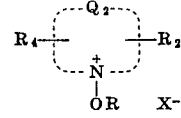

and

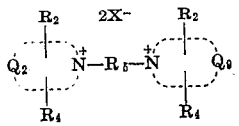

wherein:

A Q₁, Q₂, Q₃, Q₇ and Q₉ each represent the nonmetallic atoms necessary to complete a five to six membered heterocyclic nucleus;

B n is a positive integer from one to four:

C m is a positive integer from one to three;

D R₅ is an alkyleneoxy radical having one to eight carbon atoms in the alkylene chain;

E. g is a positive integer from one to two;

F. X is an acid anion;

G. L is a methine linkage;

H. R is selected from the group consisting of an alkyl radical and an acyl radical;

I. D, E, J, R₂ and R₄ are each selected from the group consisting of an aryl radical, a hydrogen atom and an alkyl radical;

J. R₃ is selected from the group consisting of an alkyl radical, an alkenyl radical, an aryl radical and an alkoxy radical, and K. G is selected from the group consisting of an anilinovinyl radical and an aryl radical.

19. The process of claim 18 wherein said cross-linking agent has the formula:

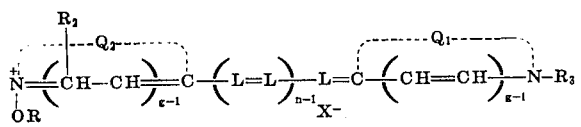

wherein R, R₂, R₃, Q₁, L, X, g and n are as previously defined.

20. The process of claim 18 wherein said cross-linking agent has the formula:

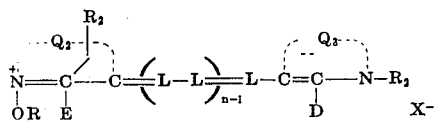

wherein R, R₂, R₃, Q₂, Q₃, L, D, E, X and n are as previously defined.

21. The process of claim 18 wherein said cross-linking agent has the formula:

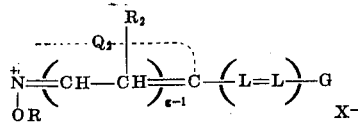

wherein R, R₂, Q₂, L, G. X, m and g are as previously defined.

22. The process of claim 18 wherein said cross-linking agent has the formula:

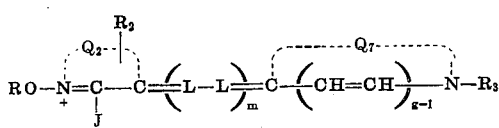

and

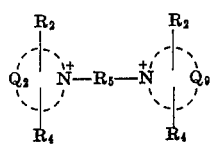

wherein:

A. Q₁, Q₂, Q₃, Q₇ and Q₉ each represent the nonmetallic atoms necessary to complete a five to six membered heterocyclic nucleus;

B. n is a positive integer from one to four;

C. m is a positive integer from one to three;

D. g is a positive integer from one to two;

E. X is an acid anion;

F. L is a methine linkage;

G. R₅ is an alkyleneoxy radical having one to eight carbon atoms in the alkylene chain;

H. R is selected from the group consisting of an alkyl radical and an acyl radical;

I. D, E, J, R₂ and R₄ are each selected from the group consisting of an aryl radical, a hydrogen atom and an alkyl radical;

J. R₃ is selected from the group consisting of an alkyl radical, an alkenyl radical, an aryl radical and an alkoxy radical; and wherein R, R₂, R₃, J, Q₂, Q₇, L, X, m and g are as previously defined.

23. The process of claim 18 wherein said cross-linking agent has the formula:

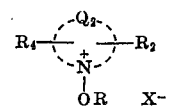

wherein R, R₂, R₄, Q₂ and X are as previously defined.

24. The process of claim 18 wherein said cross-linking agent has the formula:

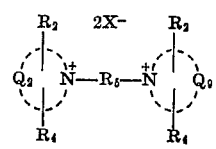

wherein R₂, R₄, Q₂, Q₉, X and R₅ are as previously defined.

25. An image-forming element comprising a support having coated thereon a layer of a cross-linkable composition comprising a polymer selected from the group consisting of gelatin and poly(vinylacetoacetate), and 1-methoxy-2-methylpyridinium p-toluenesulfonate as the cross-linking agent in an amount sufficient to produce 0.1 to 10 percent of aldehyde in the total composition upon decomposition with electromagnetic radiation.

26. An image-forming element comprising a support having coated thereon a layer of a cross-linkable composition comprising a polymer selected from the group consisting of gelatin and poly(vinylacetoacetate), and 1-methoxy-4-methylpyridinium p-toluenesulfonate as the cross-linking agent in an amount sufficient to produce 0.1 10 percent by weight of aldehyde in the total composition upon decomposition with electromagnetic radiation.

27. An image-forming element comprising a support having coated thereon a layer of a cross-linkable composition comprising a polymer selected from the group consisting of gelatin and poly(vinylacetoacetate), and anhydro-2-methyl-1-(3-sulfopropoxy)pyridinium hydroxide as the cross-linking agent in an amount sufficient to produce 0.1 to 10 percent by weight of aldehyde in the total composition upon decomposition with electromagnetic radiation.

28. An image-forming element comprising a support having coated thereon a layer of cross-linkable composition comprising a polymer selected from the group consisting of gelatin and poly(vinylacetoacetate), and 1,1'-tetramethylenedioxybis(2-methylpyridinium)dipromide as the cross-linking agent in an amount sufficient to produce 0.1 to 10 percent by weight of aldehyde in the total composition upon decomposition with electromagnetic radiation.

An image-forming element comprising a support having coated thereon a layer of a cross-linkable composition comprising a polymer selected from the group consisting of gelatin and poly(vinylacetoacetate), and 1,1'-tetramethylenedioxybis(4-methylpyridinium)dibromide as the cross-linking agent in an amount sufficient to produce 0.1 to 10 percent by weight of aldehyde in the total composition upon decomposition with electromagnetic radiation.

\* \* \* \* \*